United States Patent Office 3,790,617
Patented Feb. 5, 1974

3,790,617
PROCESS FOR PREPARATION OF ORGANIC DINITRILES
Yoshiyasu Masada and Teruo Yasue, Kurashiki, Japan, assignors to Kurashiki Rayon Co., Ltd., Kurashiki, Japan
No Drawing. Filed Jan. 21, 1969, Ser. No. 792,812
Claims priority, application Japan, Jan. 25, 1968, 43/4,509
Int. Cl. C07c *121/02, 121/20, 121/26*
U.S. Cl. 260—465.8 D       8 Claims

ABSTRACT OF THE DISCLOSURE

A process for preparing organic dinitriles by dimerization of acrylonitrile comprising reacting acrylonitrile with hydrogen in a gaseous phase at 100 to 450° C. under a total pressure of 1 to 20 atmospheres by using as catalyst ruthenium metal or a ruthenium compound reducible to ruthenium metal under reaction conditions. Catalytic activity of the catalyst can be increased by addition of an alkali metal hydroxide or a mixture of a halide of nickel, chromium, molybdenum or tungsten with an organic phosphorus compound.

---

This invention relates to a process for preparation of organic dinitriles from acrylonitrile, and particularly to a process for preparation of organic dinitriles by dimerizing acrylonitrile in a gaseous phase and in the presence of a catalyst containing ruthenium.

Heretofore, dimerization to be conducted simultaneously with an electrical hydrogenation has been known to produce organic dinitriles from acrylonitrile, but this method has a defect of high cost. In recent years, catalytic methods involving various catalysts were reported. All of these known methods, however, are practiced in liquid phase.

The process of the invention is a novel process by which organic dinitriles are produced by dimerizing acrylonitrile in gaseous phase. Compared with the liquid phase process, this gaseous phase process makes it possible to increase conversion of acrylonitrile, and separate and recover products with simplicity. Furthermore, it is possible to conduct the reaction continuously and use a large-sized apparatus, when the process of the invention is employed. In addition to these advantages which cannot easily be achieved by the liquid phase process, the selectivity of dinitrile formation is increased as compared with the liquid phase process.

The present invention provides a process for preparation of organic dinitriles, which comprises contacting acrylonitrile with hydrogen in a gaseous phase, at a temperature in the range of 100° to 450° C. and under a total pressure (absolute pressure) of 1 to 20 atmospheres in the presence as a catalyst of a member selected from the group consisting of ruthenium metal and ruthenium compounds reducible to ruthenium metal under reaction conditions.

The "ruthenium compounds reducible to ruthenium metal under reaction conditions" used in the invention mean, for instance, ruthenium salts such as ruthenium chlorides ($RuCl_2$, $RuCl_3$, $RuCl_4$), ruthenium nitrate, and ruthenium bromide. Among these ruthenium salts, ruthenium trichloride is most preferable.

The catalytic activity and the selectivity of dinitrile formation can be enhanced by adding to the catalyst a hydroxide of an alkali metal, or a combination of a halides of nickel, chromium, molybdenum or tungsten and an organo-phosphorus compound. As the hydroxide of an alkali metal, lithium hydroxide, sodium hydroxide, potassium hydroxide, cesium hydroxide, and rubidium hydroxide can be used, but lithium hydroxide, potassium hydroxide and sodium hydroxide are preferable. As the halides of nickel, chromium, molybdenum or tungsten, chlorides and bromides are of particular preference. Useful compounds as the organophosphorus compound are compounds expressed by the general formula

wherein $R_1$, $R_2$ and $R_3$ may be the same or different, and represent a hydrocarbon group, for instance, an aryl group such as phenyl, an alkyl group such as ethyl, propyl and butyl, and a cycloalkyl group such as cyclohexyl. Examples of the organo-phosphorus compounds are $P(C_6H_5)_3$, $P[(C_6H_5)_2(C_2H_5)]$ and $P(n\text{-}C_4H_9)_3$.

An amount of the alkali hydroxide to be added to the ruthenium catalyst of the invention is 0.5–20 moles, preferably 5 to 15 moles per mole of ruthenium metal. The halides of nickel, chromium, molybdenum or tungsten and the organo-phosphorus compound may be added to the catalyst in an amount such that the molar ratio of (Ru):(Ni, Cr, Mo or W:(P) is from 1:0:0.1 to 1:5:10, advantageously from 1:0.5:0.5 to 1:1:2.

Preferably, the catalyst of the invention is used in the form deposited on a carrier. Usable materials as the carrier are active carbon, alumina, silica, silica-alumina, diatomaceous earth and pumice. A surface area of the carrier is preferably in the range of 1 to 250 m.²/g. It has been found that alumina having an $Al_2O_3$ content of at least 85% by weight and having a surface area of 10 to 150 m.²/g. is of particular advantage. Surface area of carriers was measured by the conventional BET method with using nitrogen.

An amount of the catalyst components to be deposited on the carrier is preferably in the range of 0.1 to 10% by weight, advantageously 1 to 5% by weight based on the weight of the carrier, calculated as ruthenium metal.

The preparation of the catalyst may be effected by an optional procedure. Usually, the catalyst components are dispersed, partly dissolved, or completely dissolved into a solvent such as tetrahydrofuran, methanol, dioxane and water, and a carrier substance is added thereto. Simultaneously with the removal of the solvent, the catalyst components are deposited on the carrier. The catalyst prepared in this manner can be directly used in the reaction. When a ruthenium compound reducible to ruthenium metal under reaction conditions is used as the catalyst, it may favorably be used after treating it with hydrogen, because such treatment results in reducing changes in the catalytic activity with the passage of reaction time. Usually, the treatment with hydrogen can be carried out at a temperature from room temperature to 500° C., but preferably at a temperature in the range of 100 to 400° C. The treating time is preferably about 1 to 50 hours.

Ruthenium compounds, especially ruthenium trichloride, are reduced easily to ruthenium metals by hydrogen in gaseous phase. For example, ruthenium trichloride on alumina is reduced completely in gaseous hydrogen at 200° C., and the similar results were obtained in the dimerization reaction systems involving hydrogen and acrylonitrile vapor. On the other hand, in liquid phase reaction, ruthenium trichloride as a catalyst is not reduced practically, and the state of the catalyst was almost unchanged in before and after the reaction.

Dimerization reaction of acrylonitrile is carried out in the presence of hydrogen ($H_2$). The molar ratio of hydrogen ($H_2$) to acrylonitrile is 1:0.1 to 1:5, preferably 1:0.5 to 1:2. Sometimes, the presence of steam in the reaction system results in increase in the selectivity of dinitrile formation. The selectivity of dinitrile formation can also be enhanced with reduction in the formation of propionitrile by adding an inert gas such as nitrogen, methane, carbon dioxide and argon to the reaction system to thereby lower the partial pressure of hydrogen and acrylonitrile.

The reaction may be performed at a temperature in the range of 100° to 450° C. In general, if the reaction temperatures is too low, it is difficult to induce the reaction. Further, if the reaction temperature is too low, the resulting dinitriles are adsorbed on the surface of the catalyst, and this becomes a cause of decrease in catalytic activity with the passage of reaction time. On the other hand, if the reaction temperature is too high, decomposition and carbonization of products occur, and it results in decrease in yield of dinitriles. For the reasons above, the reaction temperature in the range of 200° to 350° is most preferable.

The reaction pressure is 1 to 20 atmospheres as a total absolute pressure. If the pressure is too high, desorption of the formed dinitriles from the surface of the catalyst is inhibited, thus bringing about a tendency of decreasing the conversion gradually. In order, therefore, to maintain a high catalytic activity, the pressure should preferably be not too high, and a pressure of 1 to 3 atmospheres (absolute) is most preferable.

Space velocity of gaseous acrylonitrile is preferably, 100-2000 vol./catalyst vol. As feed acrylonitrile, pure acrylonitrile and acrylonitrile of industrial purity may be used. Propionitrile, water, saturated hydrocarbons, inert gases (carbon dioxide, nitrogen) etc. do not affect the reaction.

The dinitriles synthesized by this reaction are mainly adiponitrile, 1,4-dicyanobutene-2, 1,4-dicyanbutene-1, and methylglutaronitrile. As by-products, hydrogenation products, such as propionitrile and amines formed by hydrogenation of the cyano group of nitriles are formed. Propionitrile can be easily converted into acrylonitrile by dehydrogenation.

Adiponitrile obtained by the process of the invention is useful as a starting material for a polymer, and 1,4-dicyanobutenes can be easily converted into adiponitrile by hydrogenation.

The analysis of each component of products was carried out by a known gas-chromatography.

The process of the invention will be described in detail by the following examples.

EXAMPLE 1

Six grams of spherical alumina (with a particle diameter of 2 mm.) was immersed for 2 hours in 15 cc. of an aqueous solution containing 0.3 g. of ruthenium trichloride ($RuCl_3$), withdrawn, and then dried. It was treated with hydrogen for 2 hours at 200° C. and under atmospheric pressure. An acrylonitrile vapor (0.07 mole/hr.) and hydrogen (0.2 mole/hr.) were passed over this catalyst at 200° C. and a pressure of one atmosphere. The reaction products were collected with a condensing tube, and subjected to a gas-chromatographic analysis. The conversion of acrylonitrile was 5.9%, and the selectivity of each product was as follows:

| | Percent |
|---|---|
| Adiponitrile | 17 |
| 1,4-dicyanobutene | 15 |
| Methylglutaronitrile | 2 |
| 2,4-dicyanobutene | 3.5 |
| Propionitrile | 57 |

EXAMPLE 2

Three grams of active carbon was mixed with an aqueous solution containing 0.2 g. of $RuCl_3$, and the mixture was evaporated to dryness at 100° C. The dried mixture was then reduced for 2 hours at 230° C. in a stream of hydrogen. It was found that $RuCl_3$ was completely converted to Ru metal. An acrylonitrile vapor (0.07 mole/hr.) and hydrogen (0.13 mole/hr.) were passed over the obtained catalyst at 230° C. and under one atmosphere. The reaction products were gas-chromatographically analyzed, and it was found that the yield of adiponitrile was 0.5% of the fed acrylonitrile.

The other products were dicyanobutene, propionitrile and methylglutaronitrile.

EXAMPLE 3

An aqueous solution of 0.067 g. of $RuCl_3$ was mixed with 1.2 g. of alumina, and the mixture was evaporated to dryness at 100° C. The dried mixture was packed into a reaction tube, and exposed to a stream of hydrogen at 150° C. for 3 hours. Subsequently, an acrylonitrile vapor (0.07 mole/hr.) and hydrogen (0.28 mole/hr.) were passed over the obtained catalyst at a temperature of 150° C. and under a pressure of one atmosphere. Gas-chromatographic analysis of the reaction products indicated that the yield of adiponitrile was 1.2% of the fed acrylonitrile. The other products were dicyanobutene, propionitrile and methylglutaronitrile.

EXAMPLE 4

Pumice (2.5 g.) was added to 10 cc. of an aqueous solution containing 0.05 g. of $RuCl_3$, and the mixture was evaporated to dryness. The so prepared catalyst was packed into a glass reaction tube, and an acrylonitrile vapor (0.1 mole/hr.) and hydrogen (0.4 mole/hr.) were passed therethrough at 250° C. and under a pressure of one atmosphere. After a 3-hour reaction, an average yield of adiponitrile was 1.02% of the fed acrylonitrile. The other products were dicyanobutene, propionitrile and methylglutaronitrile.

EXAMPLE 5

Alumina (sold under the trade name "Neobead D–4") was calcined at 1050° C. to form a carrier having an $Al_2O_3$ content of 93% and a surface area of 130 $m.^2/g$. Six grams of said carrier was put into 10 cc. of an aqueous solution containing 0.3 g. of $RuCl_3$, and the mixture was evaporated to dryness. The dried mixture was reduced for 2 hours at 200° C. in a stream of hydrogen. An acrylonitrile vapor (0.07 mole/hr.) and hydrogen (0.2 mole/hr.) were passed over this catalyst at 200° C. and under a pressure of one atmosphere. The reaction products were callected by condensing tube, and subjected to a gas-chromatographic analysis. It was found that the conversion of acrylonitrile was 4.5%, and the selectivity of each product was as follows:

| | Percent |
|---|---|
| Adiponitrile | 33.5 |
| 1,4-dicyanobutene | 20.1 |
| Methylglutaronitrile | 3 |
| 2,4-dicyanobutene | 6 |
| Propionitrile | 33 |

EXAMPLE 6

Alumina was calcined at 1020° C. to form a carrier having a surface area of 70 $m.^2/g$. and an $Al_2O_3$ content of 99.2%. Six grams of the obtained carrier was mixed with an aqueous solution of 0.2 g. of $RuCl_3$, and the mixture was evaporated to dryness at 100° C. It was then reduced for 2 hours at 250° C. in a stream of hydrogen. An acrylonitrile vapor (0.07 mole/hr.) and hydrogen (0.13 mole/hr.) were passed over the resulting catalyst at 250° C. and under a pressure of one atmosphere. The products were gas-chromatographically analyzed. It was found that the yield of adiponitrile was 2.4% of the fed acrylonitrile. The other products were dicyanobutene, propionitrile and methylglutaronitrile.

EXAMPLE 7

Powdery active alumina was calcined for 5 hours at 1050° C. to form a carrier having a surface area of 130 $m.^2/g$. and an $Al_2O_3$ content of 93%. The carrier (1.2 g.) was immersed in 7 cc. of an aqueous solution containing 0.067 g. of $RuCl_3$, and was evaporated to dryness at 100° C. The dried product was packed into a reaction tube with an inner diameter of 5 mm., and reduced for 3 hours at 150° C. in a stream of hydrogen. An acrylonitrile vapor (0.07 mole/hr.) and hydrogen (0.28 mole/hr.) were passed over the obtained catalyst at 220° C. and under a pressure of one atmosphere. Gas-chromatographic analysis of the products revealed that the yield of adiponitrile was 1.5% of the fed acrylonitrile. The other products were dicyanobutene, propionitrile and methylglutaronitrile.

EXAMPLE 8

The carrier (2.5 g.) obtained in Example 7 was added to 10 cc. of an aqueous solution containing 0.05 g. of $RuCl_3$, and the mixture was evaporated to dryness. The dried mixture was packed into a glass reaction tube, and an acrylonitrile vapor (0.1 mole/hr.) and hydrogen (0.4 mole/hr.) were passed therethrough at a temperature of 250° C. and under a pressure of one atmosphere. It was found that after a 3-hours reaction, the average yield of adiponitrile was 1.3% of the fed acrylonitrile. Analysis of the catalyst after this 3-hours reaction indicated that it contained no chlorine (Cl), and $RuCl_3$ had been completely converted into Ru metal. The other products were dicyanobutene, propionitrile, methylglutaronitrile.

EXAMPLE 9

Ten grams of alumina having a surface area of 75 m.$^2$/g. and an $Al_2O_3$ content of 99% was immersed for 2 hours in an aqueous solution of 0.3 g. of $RuCl_3$ and 0.6 g. of potassium hydroxide (KOH) in 20 cc. of water, withdrawn, and dried, followed by treatment with hydrogen for 2 hours at 200° C. An acrylonitrile vapor (0.07 mole/hr.) and hydrogen (0.2 mole/hr.) were passed over the obtained catalyst at a temperature of 250° C. and under a pressure of one atmosphere. Gas-chromatographic analysis of the products indicated that the conversion of acrylonitrile was 6.6%, and the selectivity of each product was as shown below.

|  | Percent |
| --- | --- |
| Adiponitrile | 32 |
| 1,4-dicyanobutene | 20 |
| Methylglutaronitrile | 4 |
| 2,4-dicyanobutene | 5 |
| Propionitrile | 35 |

EXAMPLE 10

Six grams of alumina was immersed for 2 hours in an aqueous solution of 0.3 g. of $RuCl_3$ and 0.6 g. of potassium hydroxide (KOH) in 20 cc. of water, withdrawn, dried, and then treated with hydrogen for 2 hours at a temperature of 200° C. and under a pressure of one atmosphere. An acrylonitrile vapor (0.07 mole/hr.) and hydrogen (0.2 mole/hr.) were passed over the obtained catalyst at a temperature of 200° C. and under a pressure of one atmosphere. The reaction products were collected in a condensing tube, and analyzed by gas-chromatography. It was found that based on the fed acrylonitrile, the yield of adiponitrile was 1.8%, and that of cis- and trans-1,4-dicyanobutene-1 combined, 0.8%. The presence of methylglutaronitrile and propionitrile was also confirmed.

EXAMPLE 11

Three grams of active carbon was mixed with an aqueous solution of 0.2 g. of $RuCl_3$ and 0.6 g. of sodium hydroxide (NaOH). The mixture was evaporated to dryness at 100° C., and treated with a stream of hydrogen for 2 hours at 230° C. An acrylonitrile vapor (0.07 mole/hr.) and hydrogen (0.13 mole/hr.) were passed over the obtained catalyst at a temperature of 230° C. and under a pressure of one atmosphere, Gas-chromatographic analysis of the products showed that the yield of adiponitrile was 0.8% of the fed acrylonitrile. The other products were dicyanobutene, propionitrile and methylglutaronitrile.

EXAMPLE 12

Two grams of alumina was mixed with an aqueous solution of 0.07 g. of $RuCl_3$ and 0.2 g. of lithium hydroxide (LiOH) in 10 cc. of water, and the mixture was evaporated to dryness at 100° C. The dried mixture was packed into a reaction tube, and exposed to a stream of hydrogen for 3 hours at 150° C. Subsequently, an acrylonitrile vapor (0.07 mole/hr.) and hydrogen (0.28 mole/hr.) were passed therethrough at a temperature of 150° C. and under a pressure of one atmosphere. Analysis of the products indicated that the yield of adiponitrile was 1.8% of the fed acrylonitrile. The other products were dicyanobutene, propionitrile and methylglutaronitrile.

EXAMPLE 13

A catalyst was prepared in the same manner as in Example 10 by depositing $RuCl_3$ and KOH on alumina, except that the catalyst was not treated with hydrogen. With the use of this catalyst, acrylonitrile and hydrogen were reacted under the same conditions as in Example 10. It was found that after a 3-hours reaction, an average yield of adiponitrile was 1.4%, and that of 1,4-dicyanobutene-1, 0.8%, both based on the fed acrylonitrile. Analysis of the catalyst after this 3 hours reaction indicated that it contained no chlorine (Cl), and $RuCl_3$ had been completely converted into Ru metal.

EXAMPLE 14

$RuCl_3$ (0.15 g.) 0.104 g. of $NiCl_2$ and 0.25 g. of $P(C_6H_5)_3$ were dispersed and partially dissolved into 30 ml. of tetrahydrofuran, followed by addition of 5 g. of spherical alumina with a particle diameter of 2 to 3 mm. and having a surface area of 50 m.$^2$/g. Tetrahydrofuran was driven off under reduced pressure, and further under atomspheric pressure by using a steam bath. The product was treated for 2 hours at 200° C. in a stream of hydrogen to form a catalyst. An acrylonitrile vapor (0.07 mol./hr.) and hydrogen gas (0.045 mol/hr.) were passed over this catalyst at 175° C. and under a pressure of 2 atmospheres. The reaction products were collected with a condensing tube. They were roughly separated into a nitrile portion and a dinitrile portion by distillation under reduced pressure. Each fraction was analyzed by gas-chromatography. It was found that the selectivity was 2% for adiponitrile, 8% for 1,4-dicyanobutene-1, and 30% for 2,4-dicyanobutene-1, and that the conversion of acrylonitrile was 30%.

EXAMPLE 15

Ruthenium chloride (0.15 g.), 0.05 g. of tungsten chloride and 0.1 g. of $P(C_6H_5)_3$ were dispersed and partially dissolved into 30 ml. of tetrahydrofuran, followed by addition of 5 g. of spherical alumina having a particle diameter of 2 to 3 mm. and having a surface area of 200 m.$^2$/g. Tetrahydrofuran was driven off under reduced pressure, and further under atmospheric pressure with the use of a steam bath. The product was treated for 2 hours at 160° C. in a stream of hydrogen to form a catalyst. An acrylonitrile vapor (0.07 mol/hr.) and hydrogen gas (0.045 mol/hr.) were passed over this catalyst at a temperature of 170° C. and under a pressure of 1.5 atmospheres. The reaction products were collected with a condensing tube, and they were roughly separated into a nitrile portion and a dinitrile portion by distillation under reduced pressure. Each fraction was analyzed gas-chromatographically. It was found that the selectivity was 15% for adiponitrile, 8% for 1,4-dicyanobutene-1, and 30% for 2,4-dicyanobutene-1, and that the conversion of acrylonitrile was 15%.

EXAMPLE 16

$RuCl_3$ (0.05 g.), 0.05 g. of $CrCl_3$ and 0.1 g. of $P(C_6H_5)_3$ were dispersed and partially dissolved in 30 ml. of methanol, followed by addition of 5 g. of spherical alumina having a particle diameter of 2 to 3 mm. and a surface area of 200 m.²/g. Methanol was driven off under reduced pressure, and further under atmospheric pressure with the use of a steam bath. The product was treated for 2 hours at 170° C. in a stream of hydrogen to form a catalyst. An acrylonitrile vapor (0.07 mol/hr.) and hydrogen gas (0.045 mol/hr.) were passed over this catalyst at a temperature of 170° C. and under a pressure of 1 atmosphere. The reaction products were collected by a condensing tube, and roughly separated into a nitrile fraction and a dinitrile fraction. Each of the fractions was subjected to gas-chromatographic analysis. It was found that the selectivity was 10% for adiponitrile, 3% for 1,4-dicyanobutene-1, 23% for 2,4-dicyanobutene-1, and 8% for 2,4-dicyanobutane, and that the conversion of acrylonitrile was 30%.

We claim:

1. A vapor phase process for preparation of oganic dinitriles comprising adiponitrile, 1,4-dicyanobutenes and methylglutaronitrile which consists essentially of passing a gaseous mixture of acrylontrile and hydrogen at a molar ratio of hydrogen to acrylonitrile of 1:0.1 to 1:5 over a solid catalyst which consists essentially of ruthenium metal deposited on a carrier at a concentration of ruthenium of 0.1 to 10% by weight based on the weight of said carrier, at a space velocity of gaseous acrylonitrile of 100 to 200 volume per catalyst volume per hour, at a temperature of 100 to 450° C. and under a total pressure of 1 to 20 atmospheres to form a gaseous reaction mixture containing said organic dinitriles, recovering said gaseous reaction mixture from the re-reaction zone, and recovering said organic dinitriles from said reaction mixture.

2. The process according to claim 1 wherein the temperature is 200° to 350° C.

3. The process according to claim 1 wherein the total pressure is 1 to 3 atmospheres.

4. The process according to claim 1 wherein the ruthenium metal is formed in situ under the reaction conditions by the addition to the reaction system of a ruthenium compound selected from the group consisting of ruthenium chloride, ruthenium nitrate and ruthenium bromide.

5. The process according to claim 4 wherein said ruthenium compound is ruthenium trichloride.

6. The process according to claim 1 wherein an alkali metal hydroxide is co-present with said ruthenium metal.

7. The process according to claim 1 wherein said ruthenium metal is supported on an alumina carrier having a surface area of 10 to 150° m.²/g.

8. A vapor phase process for preparation of organic dinitriles comprising adiponitrile, 1,4-dicyanobutenes and methylglutaronitrile which consists essentially of passing a gaseous mixture of acrylonitrile and hydrogen at a molar ratio of hydrogen to acrylonitrile of 1:0.1 to 1:5 over a solid catalyst which consists essentially of ruthenium metal deposited on a carrier at a concentration of ruthenium of 0.1 to 10% by weight based on the weight of said carrier and, conjointly present with said ruthenium metal (1) a member selected from nickel chloride and bromide, chromium chloride and bromide, molybdenum chloride and bromide, and tungsten chloride and bromide, and (2) an organo-phosphorus compound of the formula

wherein $R_1$, $R_2$ and $R_3$ are each independently selected from an alkyl group of up to 4 carbon atoms, phenyl and cyclohexyl groups at a space velocity of gaseous acrylonitrile of 100 to 2000 volume per catalyst volume per hour, at a temperature of 100 to 450° C. and under a total pressure of 1 to 20 atmospheres to form a gaseous reaction mixture containing said organic dinitriles, recovering said gaseous reaction mixture from the reaction zone, and recovering said organic dinitriles from said reaction mixture.

References Cited

UNITED STATES PATENTS

| 3,484,475 | 12/1969 | Cornforth et al. | 260—465.8 |
| 3,013,066 | 12/1961 | Alderson | 260—465.8 X |
| 3,560,561 | 2/1971 | Scheben et al. | 260—465.8 D X |
| 3,562,181 | 2/1971 | Linn et al. | 260—465.8 D X |

FOREIGN PATENTS

| 89,767 | 7/1967 | France | 260—465.8 |
| 1,546,530 | 10/1968 | France | 260—465.8 |
| 1,079,696 | 8/1967 | Great Britain | 260—465.8 |
| 1,451,443 | 4/1966 | France | 260—465.8 |
| 1,472,033 | 1/1967 | France | 260—465.8 |

OTHER REFERENCES

"French Patent Abstracts," vol. 8, No. 20, p. 5: 1, May 20, 1968, Abstract of French patent, FR 1,520,883.

Societe, C. A., vol. 66, 1967, p. 75705.

Rone-Poulenc, C. A., vol. 66, 1967, p. 85483.

Misono et al.: C. A., vol. 67, 1967, p. 11158.

JOSEPH P. BRUST, Primary Examiner

U.S. Cl. X.R.

260—465.1